March 12, 1968  B. M. BAKER  3,372,666
DEPTH CONTROLLER
Filed Oct. 24, 1965  2 Sheets-Sheet 2
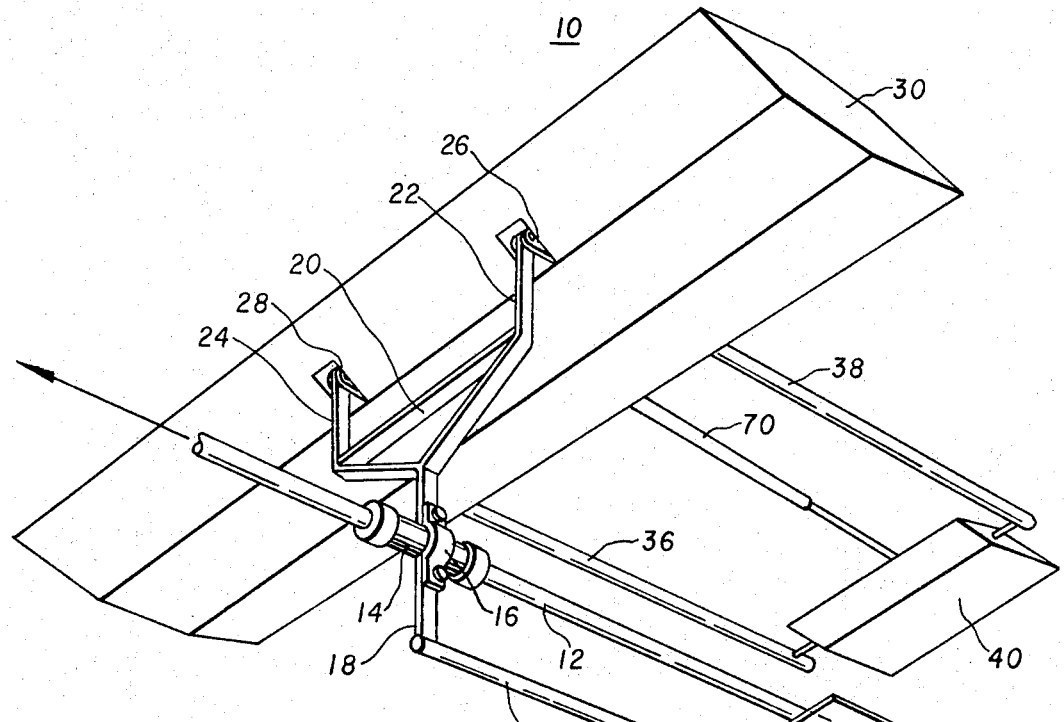
Fig. 2
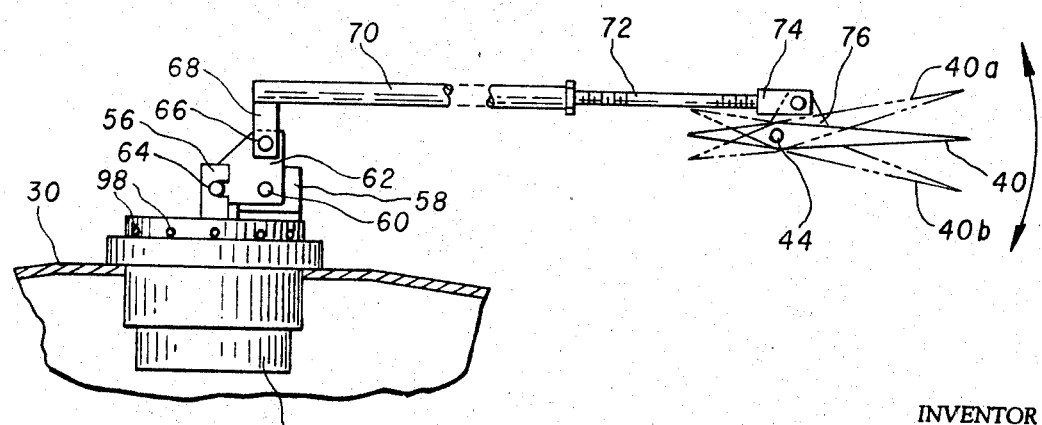
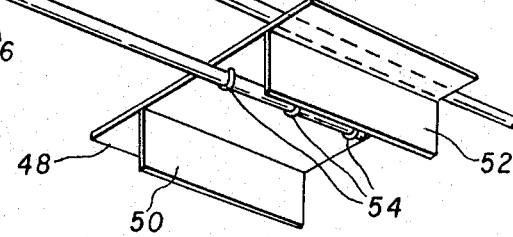
Fig. 3
INVENTOR
Buford M. Baker
BY René E. Grossman
ATTORNEY United States Patent Office 3,372,666
Patented Mar. 12, 1968

3,372,666
DEPTH CONTROLLER
Buford M. Baker, Dallas, Tex., assignor to Texas Instruments Incorporated, Dallas, Tex., a corporation of Delaware
Filed Oct. 24, 1965, Ser. No. 504,724
5 Claims. (Cl. 114—235)

ABSTRACT OF THE DISCLOSURE

Apparatus for controlling the depth of a device such as a towed streamer in a fluid medium. A pressure responsive sensor is connected to a wing for controlling the variance of the deflection angle of an elevator and the wing in a linear manner related to the depth of the sensor within a predetermined range of depths and in a constant manner at all depths above and below the predetermined range.

---

This invention relates to a depth controller and more particularly to an apparatus for controlling the depth of a towed streamer or other such device in a fluid medium.

Streamers constructed so as to be approximately neutrally bouyant and containing sensing elements for receiving acoustic energy propogated through the water are widely used, such as for seismic exploration for oil. It has been found that if the front end of a streamer is controlled by appropriate means to maintain a certain depth, and the streamer is carefully adjusted as to weight and size to be nearly neutrally bouyant, then the streamer will maintain a near constant depth throughout its length, in most cases, if it is of rather short length (for example, less than 2400 feet). If the streamer is as long as 8000 feet, for example, it is extremely difficult to maintain a reasonably constant depth throughout its length by weight and bouyancy adjustment alone. This is because a streamer cannot be made exactly bouyant as they are usually oil filled, and temperature variations cause changes in the density of the oil, thereby changing the bouyancy. Also, changes in the salinity of the sea water, from one location to another, cause variations in the bouyancy. This is an especially large effect off-shore from the mouths of rivers where the fresh water from the rivers dilutes the sea water.

It is therefore an object of this invention to provide an apparatus for maintaining a body at a predetermined depth, the depth being sensed by a pressure sensor assembly included within the apparatus.

Another object of the invention is to provide an apparatus which includes an elevator means that is responsive to an output from a pressure sensing device.

Yet another object of the invention is to provide an apparatus which seeks a predetermined depth at a maximum rate and then maintains that depth.

Other objects and features of the invention will become more readily understood from the following detailed description and appended claims when read in conjunction with the accompanying drawings, in which like reference numerals designate like parts throughout the figures thereof, and in which:

FIGURE 2 is a perspective view of the depth controller viewed from the bottom;

FIGURE 3 is a view of the interconnection of the shaft of the pressure sensor assembly with the elevator of the controller;

FIGURE 4 is a cross-section of the pressure sensor assembly;

FIGURE 5 shows the relationship of elevator angle to depth in the water.

Figure 1:
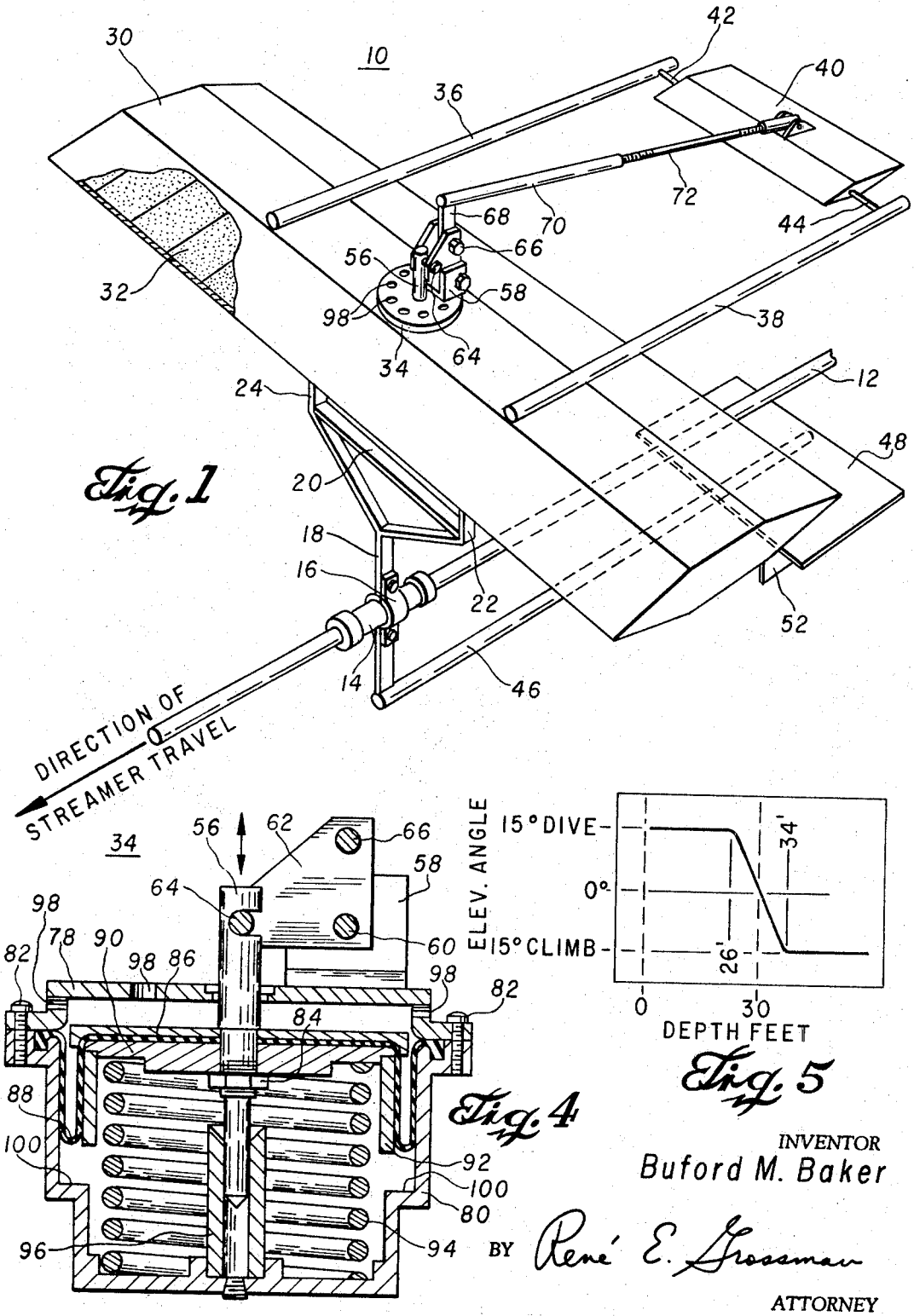
FIGURE 1 is a perspective view of the depth controller viewed from the top.

Referring now to FIGURES 1 and 2, the depth controller is indicated generally by the reference numeral 10. To this depth controller is attached a streamer 12 having a metallic sleeve 14 as an integral part thereof. The metallic sleeve is attached to the point on the streamer for maintaining a portion of the streamer at a predetermined depth, for example, at a depth of 30 feet. The depth controller 10 is connected to the streamer 12 by means of an attaching clamp 16 which surrounds the sleeve 14 and is bolted to a metallic Y support bracket 18. Across the upper portion of the support bracket is a bar 20 which provides additional support and strength for the Y bracket. The ends 22 and 24 of the Y support bracket are connected to hinges 26 and 28, respectively (FIGURE 2), which allow wing member 30 to pivot an amount dependent upon the angle of deflection of the elevator 40.

Wing member 30, in this embodiment, is hollow and made of plywood although it can be made of any other suitable material. Included in the outer sections of the wing are styrofoam blocks 32 to add bouyancy or floatation to same. In the center section of the wing is a pressure sensor assembly 34, the structure of which will be described below. Elevator booms 36 and 38 are attached to wing 30 at one end, while each of the other ends provide support for elevator 40. The elevator 40 is connected to each of the elevator booms 36 and 38 by hinges 42 and 44, respectively.

Since the wing 30 is buoyant (due to its plywood material and the styrofoam blocks in the wing), it is necessary to provide additional weight and stability below the streamer 12 to maintain wing 30 in a horizontal position. This weight is provided by steel tube 46 attached to the end of the metallic Y support bracket under the streamer. On the other hand, the stability is provided by a horizontal stabilizer or tail assembly 48 which has attached to it two rudders 50 and 52. The tail assembly 48 and rudders 50 and 52 may be made of a suitable material, such as plywood. The tail assembly is attached to the weighted steel tube 46 by means of clamps 54. By use of the weighted tube and the tail assembly, the necessary weight and horizontal stability is provided for wing member 30.

FIGURE 3 shows the apparatus necessary to translate the output of shaft 56 of pressure assembly 34 to elevator 40. As was stated previously, the pressure assembly 34, in this embodiment, sits in the center portion of wing 30 (as shown in FIGURE 2) with shaft 56 extending through the wing. Attached to bracket 58 and fixed at point 60 is a bell crank 62. This crank is secured at points 64 and 66 to shaft 56 and tang 68, respectively. The tang acts as a spacer to transfer the motion at point 66 to the control rod 70. Since point 60 is fixed and points 64 and 66 are free to rotate, the vertical motion of shaft 56 will be transmitted into a substantially horizontal motion at point 66, this motion being subsequently transferred by the tang 68 to the control rod 70. One end of extension rod 72 is attached to control rod 70 and the other end of said extension rod is coupled to an extension rod end 74. This rod end has a hole in it which allows the elevator hinge to pass therethrough. As shown in FIGURE 1, hinges 42 and 44 allows the elevator 40 to rotate around the points attached to the elevator booms 36 and 38. Accordingly, if shaft 56 were to move downward from its midpoint position, this motion would be transmitted to elevator 40 which would, in turn, move the elevator upward to a position such as that shown at 40a. An upward movement by shaft 56 would have the reverse effect and cause the elevator to move to a position such as that shown in 40b. Thus the control rod and pressure sensor assembly determine the angle of deflection of the elevator 40.

FIGURE 4 shows the pressure sensor assembly 34 which senses the depth of depth controller 10. The pressure sensor assembly cover 78 is attached to the barrel 80 by means of screws 82. Extending through the center of the assembly is the shaft 56 which, in combination with nut 84, bolts together the piston cap 86, the elastic diaphram 88 and the piston 90. Attached to the piston (by epoxy cement, for example) is a piston skirt 92. A precompressed spring 94 is lodged between the piston 90 and the floor of the barrel 80. A guide 96 directs the motion of shaft 56. Inlet ports 98 enable water to enter into the upper portion of the barrel to establish the hydrostatic pressure. The downward motion of the shaft 56 is limited by mechanical stop 100, whereas the upward movement of the shaft is limited by the top portion of piston cap 86 coming in contact with the bottom portion of pressure assembly cover 78.

FIGURE 5 is a graphical representation of the elevator angle deflection with depth and will be discussed in connection with the operation of the device hereinbelow.

In operation, the pressure sensor assembly 34 senses the depth of the water and also furnishes the forces necessary to position the elevator 40. The spring 92 is precompressed during the assembly of the pressure sensing device. Therefore, at the surface of the water, the spring 92 is pushing the piston assembly against the lower surface of the assembly cover 78. With the shaft 56 thus at its uppermost position, the elevator 40 will be in position 40b (FIGURE 3) which will be the maximum dive angle of the device. This can be seen in FIGURE 5, for at zero depth (that is at the water surface), the elevator 40 will have a 15 degree or maximum dive angle. As the depth controller begins to dive, water will enter through the inlet ports 98, thus allowing the hydrostatic pressure to be transmitted to the interior of the barrel, whereupon this pressure exerts a force against the top of the piston cap 86 and the spring 94. Downward movement of the piston does not occur, however, until there is sufficient hydrostatic pressure (depth) to overcome the initial precompression force of the spring. As can be seen in FIGURE 5, the piston, and therefore the elevator, will not move until a depth of 26 feet is reached; that is, at that depth the hydrostatic pressure of the water equals the precompression force of the spring. It should be observed that the particular forces being produced upon the elevator are also transmitted through the elevator booms 36 and 38 to the wing member 30, thus forcing the wing into a dive or climb angle in accordance with the position of the elevator 40.

As the hydrostatic pressure of the water exceeds the initial precompression of the spring, the piston will be forced downward, thus producing a downward motion of shaft 56. As shaft 56 is forced downward, the elevator angle will be reduced until at a 30 foot depth the piston is at its mid-position in the barrel and the elevator angle will be zero degrees (as shown in FIGURE 5). The wing member 30 will also be at zero angle to the water flow and there will be no diving force exerted. The streamer 12 will then be towed at this 30 foot depth.

If the streamer 12 is heavier than neutrally bouyant, the depth controller 10 will be forced to a depth greater than 30 feet. As an example, assume that the streamer 12 sinks to 40 feet. At this depth, the hydrostatic pressure will be in excess of the spring tension in spring 94 and the piston assembly 90 will be at its maximum downward position. This position corresponds to the point at which piston skirt 92 comes into contact with the mechanical piston stop 100. At this depth, the shaft 56 will be in its maximum downward position and the elevator 40 will be in position 40a (FIGURE 3), the maximum climb angle. Therefore, the depth controller will climb until it reaches that depth at which the force of the spring is sufficient to overcome the hydrostatic pressure of the water and move the piston skirt 92 off of the mechanical stop 100. This point corresponds to a depth of 34 feet (as shown in FIGURE 5), and as the streamer 12 and depth controller continue to climb, the decreased water pressure on the piston 90 causes a reduction of elevator angle until at 30 feet the piston assembly will again be in the mid-position, with the elevator angle correspondingly being at zero degrees. Wing member 30 will be at a zero degree angle to the water flow and there will no longer be a climbing force exerted.

It should be noted that the depth controller 10 automatically reaches that climbing or diving angle which will counterbalance the force acting upon it. It should be further noted that the piston motion is not proportional to depth (as can be seen in FIGURE 5). The depth controller will climb or dive at a maximum angle (whichever is necessary) to approach the desired depth. This is assured in shallow water by the precompression of the spring 94 exceeding the hydrostatic pressure, thereby maintaining the shaft 56 at its maximum upward position (which corresponds to the maximum elevator dive angle). If the device is too deep in the fluid medium, the hydrostatic pressure of the medium will substantially exceed the tension of the spring and force the piston and shaft against the mechanical stop 100 to its maximum downward position, which corresponds to the maximum elevator climb angle. This means of turning the elevator 40 through a full range of 30 degrees over a depth change of 8 feet results in control of the depth very close to the desired 30 foot depth, even though the streamer 12 is either too heavy or too light.

Although the present invention has been shown and illustrated in terms of a device for controlling a streamer at a 30 foot depth, it will be apparent that the device can be made to control a body at any desired depth by selecting a suitable spring for the pressure sensor assembly. Also, although the device has been described as being useful for maintaining predetermined depths for seismic streamer applications, it will be further apparent that the depth controller can be used for controlling the towed depth of other equipment, such as sonar transducers and sensors for measuring temperature, salinity, light intensity, and the like.

It is to be understood that the form of the invention, herewith shown and described, is to be taken as a preferred example of the same, and that various changes in the shape, size and arrangement of parts may be resorted to without departing from the spirit and scope of the invention as defined in the appended claims.

What is claimed is:

1. A depth controller for maintaining a body at a predetermined depth in a fluid medium, comprising:
    (a) means responsive to the pressure of said medium for generating a control mechanical output linearly related to the depth of said body within a predetermined range of depths and for generating a constant mechanical output at all depths above and a constant mechanical output at all depths below said predetermined range, said means comprising a barrel and a piston having a range of travel within said barrel limited in one direction by a cap on one end of said barrel and in the other direction by a shoulder within said barrel and spaced from the other end of said barrel and
    (b) variable deflection means responsive to said mechanical outputs for controlling the depth of said body in said medium, the angle of deflection of said variable deflection means being proportional to said control or said constant mechanical outputs.

2. A depth controller for maintaining a body at a predetermined depth in a fluid medium, comprising:
    (a) means responsive to the pressure of said medium for generating a control output linearly related to the depth of said body within a predetermined range of depths and for generating a constant output at all depths above and a constant output at all depths below said predetermined range said means comprising a barrel and a piston having a range of travel within said barrel limited in one direction by a cap on one end of said barrel and in the other direction by a shoulder within said barrel and spaced from the other end of said barrel, (b) elevator means having a variable angle of deflection responsive either to said control output or the constant outputs for varying its angle of deflection when said body deviates from said predetermined depth, and (c) wing means having a variable angle of deflection responsive to the deflection of said elevator means for controlling the depth of said body.

3. A depth controller for maintaining a body at a predetermined depth in a fluid medium, comprising:

(a) means responsive to the pressure of said medium for generating an output linearly related to the depth of the body within a predetermined range of depths and also responsive to the pressure of said medium for generating a constant output at all depths above and a constant output at all depths below said predetermined range, (b) control means responsive either to said output or said constant outputs of said first-mentioned means, (c) elevator means having a variable angle of deflection responsive to said control means for varying its angle of deflection when said body deviates from said predetermined depth, (d) wing means having a variable angle of deflection responsive to the deflection of said elevator means, (e) support means, said support means being pivotally connected to said wing means, and (f) stabilizing means connected to said support means for maintaining said wing means in a horizontal position.

4. A depth controller for maintaining a body at a predetermined depth in a fluid medium, comprising:

(a) a pressure sensor means having:
   (1) a movable shaft with a maximum and minimum output and varying linearly therebetween, said output being indicative of the depth of said body in said medium,
   (2) a piston assembly responsive to the pressure of the medium, said assembly being attached to said shaft,
   (3) a precompressed spring exerting a force against said piston assembly, (b) control means responsive to said output, (c) elevator means having a variable angle of deflection responsive to said control means for varying its angle of deflection when said body moves from said predetermined depth, (d) bouyant wing means having a variable angle of deflection responsive to the deflection of said elevator means, (e) support means, said support means being pivotally connected to said wing means, and (f) stabilizing means connected to said support means for maintaining said wing means in a horizontal position.

5. A depth controller for maintaining a towed body at a predetermined depth in a fluid medium comprising:

(a) a cylinder having a piston therein, (b) a compression spring forcing said piston against the top of said cylinder, (c) a flexible diaphragm means for sealing said piston to said cylinder while admitting movement of said piston within said cylinder, (d) a structure forming a flow channel leading into said cylinder to force said piston against said spring, (e) stop means comprising a stepped diameter in said cylinder providing a shoulder facing the top of said cylinder for limiting travel of said piston into said cylinder to a linear range of said spring, and (f) means connected to said body and responsive to the position of said piston in said cylinder to control the attitude of said body.

References Cited

UNITED STATES PATENTS

| | | | |
|---|---|---|---|
| 1,666,787 | 4/1928 | Michelin | 73—409 |
| 2,718,145 | 9/1955 | Nisle | 73—410 |
| 2,729,910 | 1/1956 | Fryklund | 114—235 |
| 2,945,469 | 7/1960 | Pulsifer | 114—235 |
| 2,980,052 | 4/1961 | Fehlner | 114—235 |

MILTON BUCHLER, *Primary Examiner.*

T. M. BLIX, *Assistant Examiner.*